Patented Oct. 8, 1929

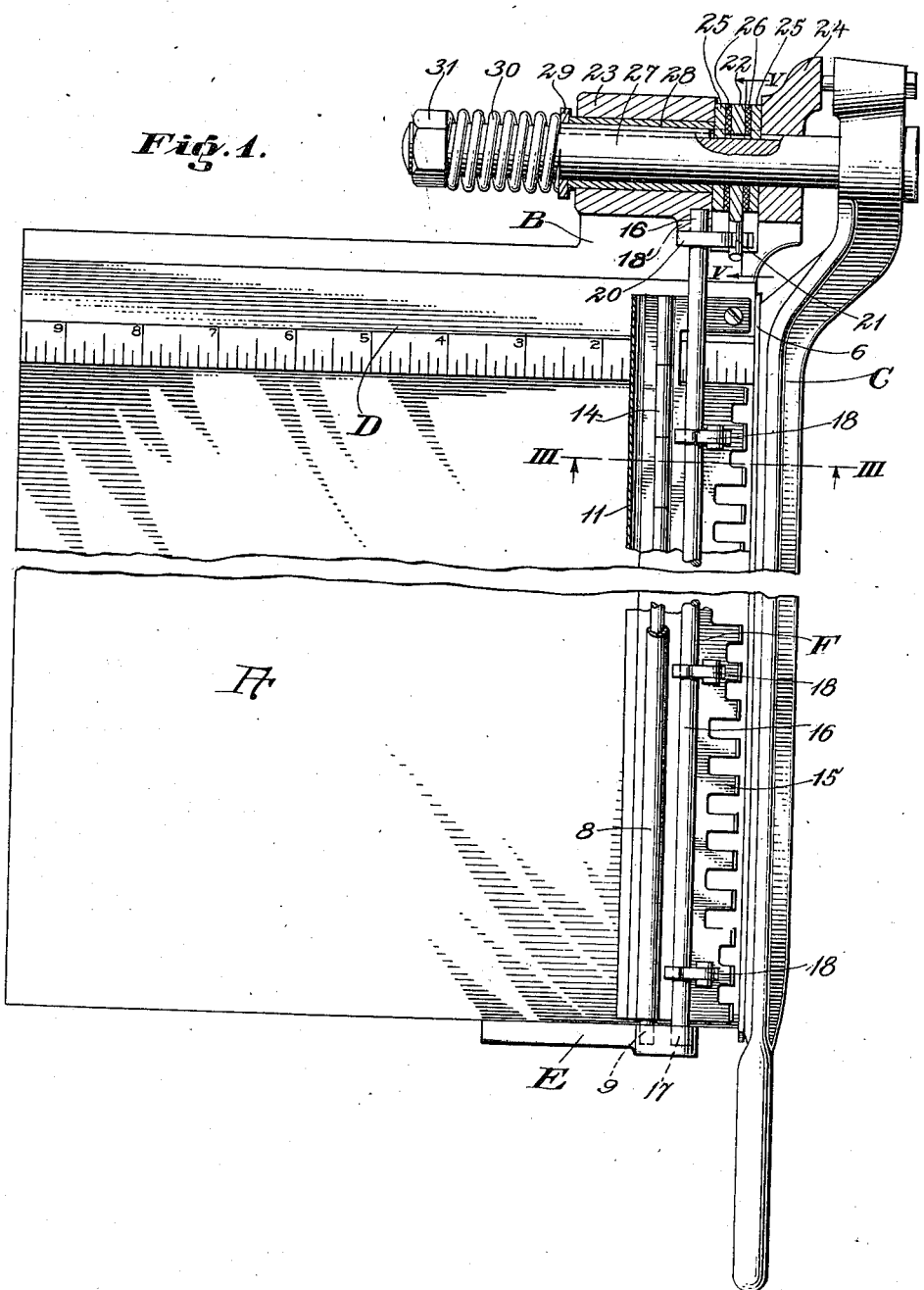

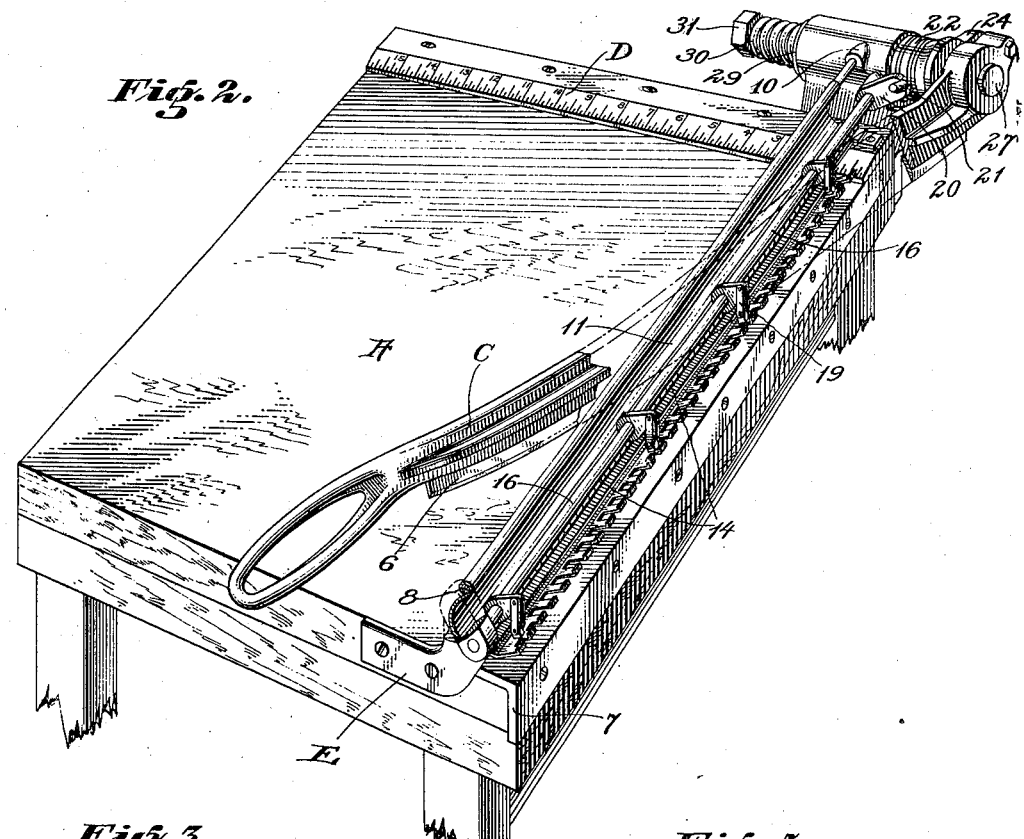
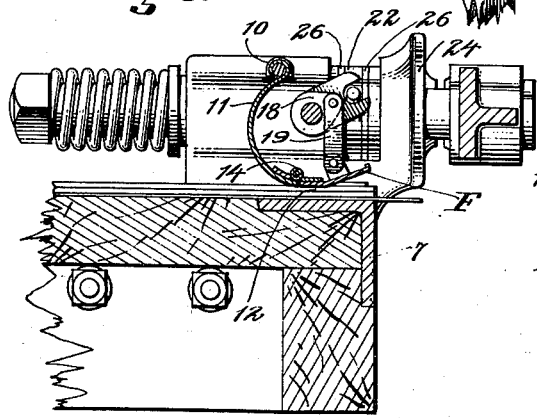
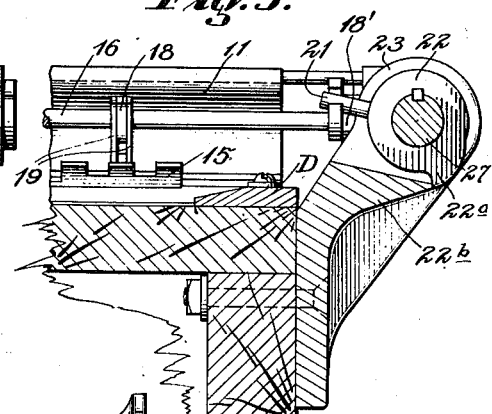
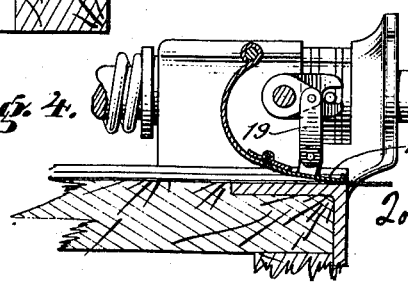

1,730,718

UNITED STATES PATENT OFFICE

HENRY BOSCH, JR., OF BURLINGAME, CALIFORNIA

COMBINATION GUARD, ALIGNING, AND CLAMPING DEVICE FOR CUTTING KNIVES

Application filed June 13, 1927. Serial No. 198,376.

This invention relates to knives for cutting or trimming sheet material such as paper, fabric and like materials, and especially to a combination guard, aligning and clamping device for cutting knives.

The object of the present invention is to generally improve and simplify the construction and operation of devices of the character described; to provide a stationary guard whereby the operator is protected against injury during downward movement of the cutter; to provide means for aligning the material to be cut or trimmed with relation to the cutting edge; and further to provide means whereby the material is automatically secured and clamped during the cutting operation of the cutter.

One form which the invention may assume is shown by way of illustration in the accompanying drawings in which:—

Fig. 1 is a plan view of the cutter, the guard, the combination aligning and clamping device and the means for actuating the same, said view being shown partially in section to disclose the clamp actuating mechanism.

Fig. 2 is a perspective view of the cutter showing the attachment of the guard, the aligning and the clamping device, and the means for actuating the same.

Fig. 3 is a vertical section taken on line III—III, Fig. 1, said view showing the clamping and aligning mechanism in raised position.

Fig. 4 is a similar section showing the aligning and clamping mechanism in clamping position.

Fig. 5 is a vertical section taken on line V—V, Fig. 1.

Referring to the drawings in detail and particularly Figs. 1 and 2, A indicates a table or other suitable support which is adapted to receive the material to be trimmed or cut. Secured at one side of the table is a bearing bracket generally indicated at B. Pivotally supported thereby is a lever C to which is secured a cutting or shearing blade generally indicated at 6 and secured at one end of the table is a shearing plate 7 which cooperates with the cutting blade 6.

The mechanism so far described is more or less a standard structure. The material to be trimmed or cut such as paper or the like is placed on the table A and it is fed forwardly over the shearing plate when it is to be cut and trimmed, the material being guided by a combination gauge and scale such as indicated at D during the trimming operation.

In the operation of cutters or trimmers of this character it has happened in a number of instances that the operator has become severely cut, and in some instances, even lost his or her fingers by placing them in a position between the shearing plate and the knife. The main object of the present invention is to prevent such injury by rendering it practically impossible for the operator to so position the fingers. Another feature of the invention is to eliminate danger of injury by providing means for clamping and securing of the material which is to be cut during the cutting operation. A still further feature is to provide means for aligning the material with relation to the cutter before the material is secured and clamped. With these features in view it will be noted that two bearing brackets are employed, one indicated at B and a second bracket at E. These brackets are placed on opposite sides of the table and are suitably secured. A rod 8 is secured between the bearing brackets at the points indicated at 9 and 10 and a guard plate generally indicated at 11 is secured thereto. This guard plate is substantially semi-circular in cross-section as shown in Figs. 3 and 4 and it extends entirely across the entire face of the table, thus guarding the shearing plate and knife from end to end and rendering it practically impossible for the operator to place the fingers in a position where they might become cut or otherwise injured. The lower edge of the guard is so positioned that sufficient space is formed between the table top and the lower edge of the guard to permit paper or other material to be trimmed or cut to be freely passed beneath the same, this space being indicated at 12 (see Fig. 3). The semicircular shape on the guard is also important as it provides an inclined surface which deflects the paper under the guard when it is being fed forwardly. For instance, the edge of the paper might have a tendency to curl upwardly, and in such instances would hamper the work of the operator unless it was deflected or flattened out by the inclined surface of the guard.

The clamping device consists of a plate F which extends from end to end of the guard and which is hingedly secured to the lower edge of the guard as indicated at 14. This plate is preferably constructed of a resilient material such as spring steel or the like, and its forward edge is cut away to form a plurality of clamping fingers such as indicated at 15. The clamping device normally assumes the raised position shown in Fig. 3, but means are employed for automatically depressing the clamping fingers so that they will secure or clamp the paper during the cutting operation. The means employed consists of a shaft or rod 16 which is journalled at opposite ends as indicated at 17 and 18 in the respective bearing brackets. This rod is provided with a plurality of crank arms 18 which are connected by means of links 19 with the clamping plate F. On the end of the rod 16 which is journalled in the bearing bracket B is secured a forked crank arm 20. This fork is engaged by means of a pin 21 which is secured and projects from the periphery of a friction actuated disc 22. This disc is rotated when movement is imparted to the knife or lever C, and the rotating movement is transmitted through the pin 21 and the forked crank 20 to rock the rod 16, and movement is thus imparted through the cranks 18 and the links 19 to either depress or raise the clamping fingers 15 as the case may be.

The bearing bracket B is divided into two bearing sections such as indicated at 23 and 24. These bearing sections are sufficiently interspaced to receive the friction disc 22 and four additional discs such as indicated at 25—25 and 26—26. The lever C is secured on a shaft 27. This shaft extends through the bearing 24 and through the several discs 22, 25—25, 26—26 and it also extends through a bushing 28 which is journalled in the bearing 23. A washer 29 engages the outer end of the bushing and a spring 30 is interposed between this washer and an adjusting nut 31 which is mounted on the outer end of the shaft 27. The discs 25—25, the washer 29 and the bushing 28 are keyed to the shaft so as to rotate therewith but they are freely slidable longitudinally of the shaft. The discs 22 and 26 on the other hand are not keyed to the shaft and as such are free to rotate or remain stationary, independent of the movement of the shaft. The friction disc 22, referring to Fig. 5, is provided with a lug 22$^a$ and this engages a stop lug 22$^b$ which forms a part of the bearing bracket B.

In actual operation, assuming that the lever C and the knife carried thereby assume a raised position, the paper to be trimmed is moved along the gauge D and in under the guard 11 until the forward edge of the paper passes over the shearing plate 7. When the paper is properly aligned, as will hereinafter be described, it is only necessary to depress the lever C so that the knife 6 will move over the forward edge of the shearing plate 7 and thereby cut or trim the paper. During the first or initial movement of the lever C, shaft 27, together with the discs 25—25 will rotate. The discs 26—26 and the disc 22 will also rotate in unison with the shaft as sufficient frictional pressure is maintained to cause such rotation. The rotation of the disc 22 will accordingly cause the pin 21 to swing in a downward direction and this movement will be transmitted through the forked crank arm 22 to rock the shaft or rod 16. This movement is in turn transmitted through the crank arms 18 and links 19 to depress the clamping plate and fingers 15. The moment clamping position is assumed, disc 22 will remain stationary during continued downward movement of the lever and rotation of the shaft 27 and discs 25—25. The paper or material is thus securely clamped during the entire shearing or cutting action of the knife. The moment the knife is elevated, the direction of rotation of shaft 27 is reversed and so is the direction of rotation of the discs 25. Discs 22 and 26—26 will also rotate in the reverse direction due to the friction imposed thereon and the clamping fingers will immediately be released, and when a certain elevated position is assumed, further movement will be stopped as lug 22$^a$ on the friction disc 22 will engage the stop member 22$^b$. The knife may, however, be returned to a complete elevated position or to any position desired as the connection between the discs 25, 26 and 22 is merely frictional. Any frictional tension desired may be obtained by merely adjusting the position of the nut 31 as this increases or decreases the tension of the spring 30 and as such forces the washer 29 and the bushing 28 with more or less pressure against the friction discs 25, 26 and 22. The spring also serves its usual function, to wit, that of maintaining the cutting blade in engagement with the forward face of the shearing plate.

The description so far submitted shows that the operator is protected against injury due to the position of the guard and also due to the fact that it is not necessary to hold the paper during the cutting and trimming action as the paper is automatically gripped and clamped the moment downward movement is imparted to the knife. It was previously stated that the clamping device indicated at F served two functions, first that of clamping and securing the material during the cutting operation, and secondly, that of aligning the paper with relation to the shearing plate and the knife.

Cutters or trimmers of the character here disclosed are extensively used for trimming blueprints, drawings, cards, papers, etc., which are provided with marginal lines and when the blueprint or paper is to be trimmed it is obvious that it should be trimmed on the marginal line or on lines parallel thereto. By referring to Fig. 1, it can be seen that if a blueprint having a marginal line is passed under the guard plate and the fingers 15, if the operator stands on the side of the table adjacent the handle of the lever C, he will merely have to sight between the fingers 15 to align the marginal line with relation to the forward ends of the fingers. That is, he sights between the fingers if he desires to trim the blue print at a point exterior of the marginal line and he sights along the ends of the fingers if he desires to trim on the marginal line or inside of the marginal line. In other words, by aligning the marginal line of the blueprint or paper with the fingers 15, he simultaneously aligns the marginal line with relation to the shearing plate 7 and the knife 6 as the ends of the fingers 15 align with said members. Thus, when an operator is working a trimmer equipped as here shown, he has two aligning members to work with, to wit, the gauge or scale D and the fingers 15. This insures neat and accurate workmanship and it furthermore materially speeds up the work or output of the operator. The worker is, at the same time, relieved of the thought of danger and is protected against injury. While the guard and the clamping and aligning device are here disclosed in conjunction with a pivotally mounted trimming knife, it is obvious that it may be attached to vertically movable knives and the like.

While other features of the present invention are more or less specifically described, I wish it understood that various changes may be restored to within the scope of the appended claims. Similarly, that various materials and finishes of the several parts employed may be such as the manufacturer may decide or varying conditions or uses may demand.

Having thus described my invention, what I claim and desire to secure by Letters Patent is:—

1. In a device of the character described, a support to receive the material to be cut, a shearing plate at one end thereof, a knife vertically movable with relation to said shearing plate, a pivotally mounted clamping member carried by the support rearwardly of the shearing plate and knife, the longitudinal axis of the pivot and the clamping member being parallel to the shearing plate, said clamping member extending substantially from end to end of the shearing plate and knife and being disposed above the support so that the material to be cut must be passed under the clamping member and placed in position to be cut, and means actuated by downward movement of the knife for swinging the clamping member into clamping position, said means automatically raising the clamping member during upward movement of the knife.

2. In a device of the character described, a support to receive the material to be cut, a shearing plate at one end thereof, a knife vertically movable with relation to said shearing plate, a flexible clamping member secured to the support and extending substantially from end to end of the shearing plate and knife, said clamping member being disposed above the support so that the material to be cut must be passed under the clamping member and placed in position to be cut, and friction means actuated by downward movement of the knife for depressing the flexible member into clamping position, said means automatically elevating the flexible clamping member during upward movement of the knife.

3. In a device of the character described, a support to receive the material to be cut, a shearing plate at one end thereof, a knife vertically movable with relation to said shearing plate, a stationary guard plate secured to the support and disposed rearwardly of the shearing plate and knife and extending substantially from end to end of the shearing plate and knife, said guard plate being disposed above the support so that the material to be cut must be passed under the stationary guard plate when placed in position to be cut, a clamping plate hingedly secured to the lower edge of the guard plate and extending substantially from end to end thereof, a plurality of interspaced flexible fingers projecting forward from said clamping plate, and means actuated by downward movement of the knife for automatically depressing the clamping member to secure the material to be cut, said means automatically raising the clamping member during upward movement of the knife.

4. In a device of the character described, a support to receive the material to be cut, a shearing plate at one end thereof, a knife vertically movable with relation to said shearing plate, a stationary guard plate secured to the support and disposed rearwardly of the shearing plate and knife and extending substantially from end to end of the shearing plate and knife, said guard plate being disposed above the support so that the material to be cut must be passed under the stationary guard plate when placed in position to be cut, a clamping member hingedly secured to the lower edge of the guard and extending substantially from end to end thereof, and a friction drive interposed between the knife and the clamping member whereby the clamping member is automatically depressed to secure the material during downward movement of the knife and whereby the clamping member is automatically elevated during upward movement of the knife.

5. In a device of the character described, a support to receive material to be cut, a shearing plate at one end thereof, a journal member at one end of the support, a shaft mounted in said journal and disposed at right angles to the longitudinal edge of the shearing plate, a knife secured on one end of the shaft, said knife extending substantially from end to end of the shearing plate and having a handle on its opposite end whereby it may be swung about its pivoted end, a combination guard and clamping plate disposed rearwardly of the shearing plate and parallel therewith, a friction member actuated by pivotal movement of the knife, and means for transmitting movement from the friction member to raise and lower the clamping member with relation to the shearing plate.

6. In a device of the character described, a support to receive material to be cut, a shearing plate at one end thereof, a knife vertically movable with relation to said shearing plate, a clamping member supported adjacent the shearing plate and extending substantially from end to end thereof, and being disposed above the support so that material to be cut must be passed under the clamping member when placed in position to be cut, a friction member actuated by movement of the knife to move in one direction when the knife moves downwardly and to move in the opposite direction when the knife moves upwardly, and means for transmitting movement from the friction member to raise and lower the clamping member with relation to the shearing plate.

7. In a device of the character described, a support to receive material to be cut, a shearing plate at one end thereof, a knife vertically movable with relation to said shearing plate, a clamping member supported adjacent the shearing plate and extending substantially from end to end thereof, and being disposed above the support so that material to be cut must be passed under the clamping member when placed in position to be cut, and means actuated by downward movement of the knife from any raised position thereof for moving the clamping member into engagement with the paper to be cut, said means automatically raising the clamping member during the initial upward movement of the knife.

HENRY BOSCH, Jr.